(12) United States Patent
Wright

(10) Patent No.: US 7,398,727 B2
(45) Date of Patent: Jul. 15, 2008

(54) TWINE CUTTING KNIFE FOR SQUARE BALER APPARATUS

(75) Inventor: John D. Wright, Olney Springs, CO (US)

(73) Assignee: Interform, Inc., Colorado Springs, CO (US)

(*) Notice: Subject to any disclaimer, the term of this patent is extended or adjusted under 35 U.S.C. 154(b) by 98 days.

(21) Appl. No.: 11/349,927

(22) Filed: Feb. 9, 2006

(65) Prior Publication Data

US 2007/0180967 A1 Aug. 9, 2007

(51) Int. Cl.
*B65B 13/00* (2006.01)
*B26D 1/00* (2006.01)
(52) U.S. Cl. .................... 100/6; 100/3; 83/909
(58) Field of Classification Search ............ 100/3, 100/6, 31, 33 R, 94; 83/909
See application file for complete search history.

(56) References Cited

U.S. PATENT DOCUMENTS

| | | | |
|---|---|---|---|
| 2,204,475 A | 6/1940 | Crandall | |
| 2,926,599 A | 3/1960 | McClellan | |
| 3,101,963 A | 8/1963 | Sullivan et al. | |
| 3,884,138 A * | 5/1975 | Rice | 100/5 |
| 4,142,746 A * | 3/1979 | White | 289/2 |
| 4,222,220 A | 9/1980 | Nolt et al. | |
| 4,268,966 A * | 5/1981 | Williams | 30/372 |
| 4,735,446 A * | 4/1988 | Homberg | 289/2 |
| 4,995,216 A | 2/1991 | Vansteelant | |
| 5,230,282 A | 7/1993 | Barnes | |
| 5,349,806 A | 9/1994 | Swearingen et al. | |
| 5,709,143 A * | 1/1998 | Bentley | 100/5 |
| 5,878,498 A | 3/1999 | Mundt | |

* cited by examiner

*Primary Examiner*—Jimmy T Nguyen
(74) *Attorney, Agent, or Firm*—Welsh & Flaxman LLC

(57) ABSTRACT

A twine cutting apparatus in combination with an automated grass baler having a twine holding reel for feeding wrapping twine to the baled grass. The apparatus has a pivoted knife arm with a first end structured to cooperate with a cam surface for actuating the knife arm to a cutting position and an opposite end for mounting a twine cutting knife. The twine cutting knife is formed with an elongated, serrated cutting edge extending a distance greater than the radius of the twine holding disc presenting an elongated cutting surface to said twine.

5 Claims, 3 Drawing Sheets

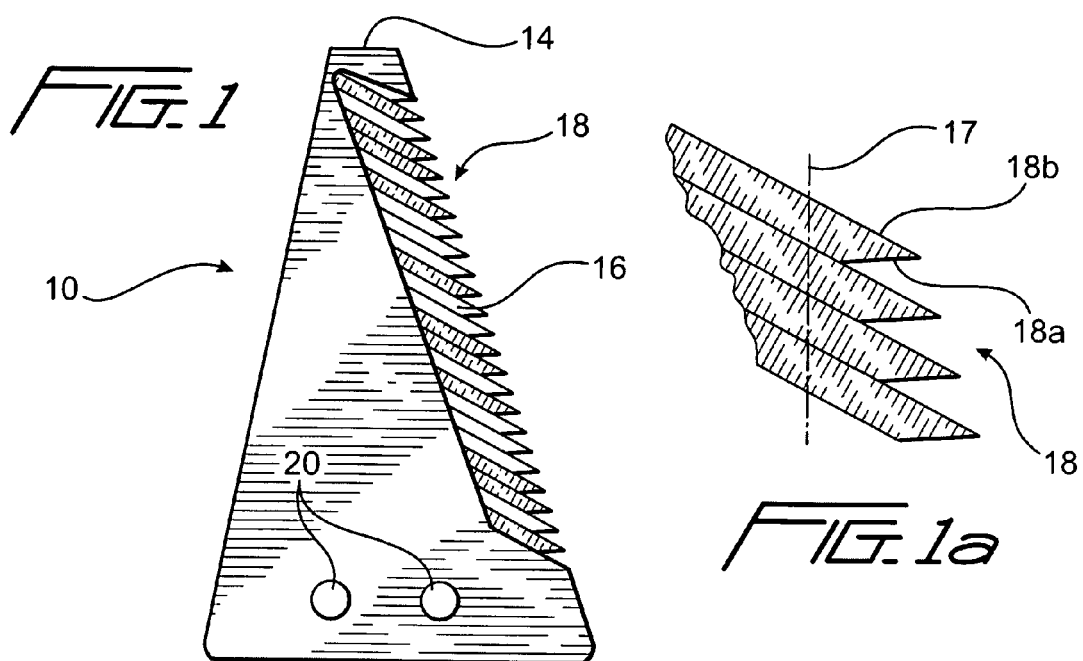
FIG. 1
FIG. 1a
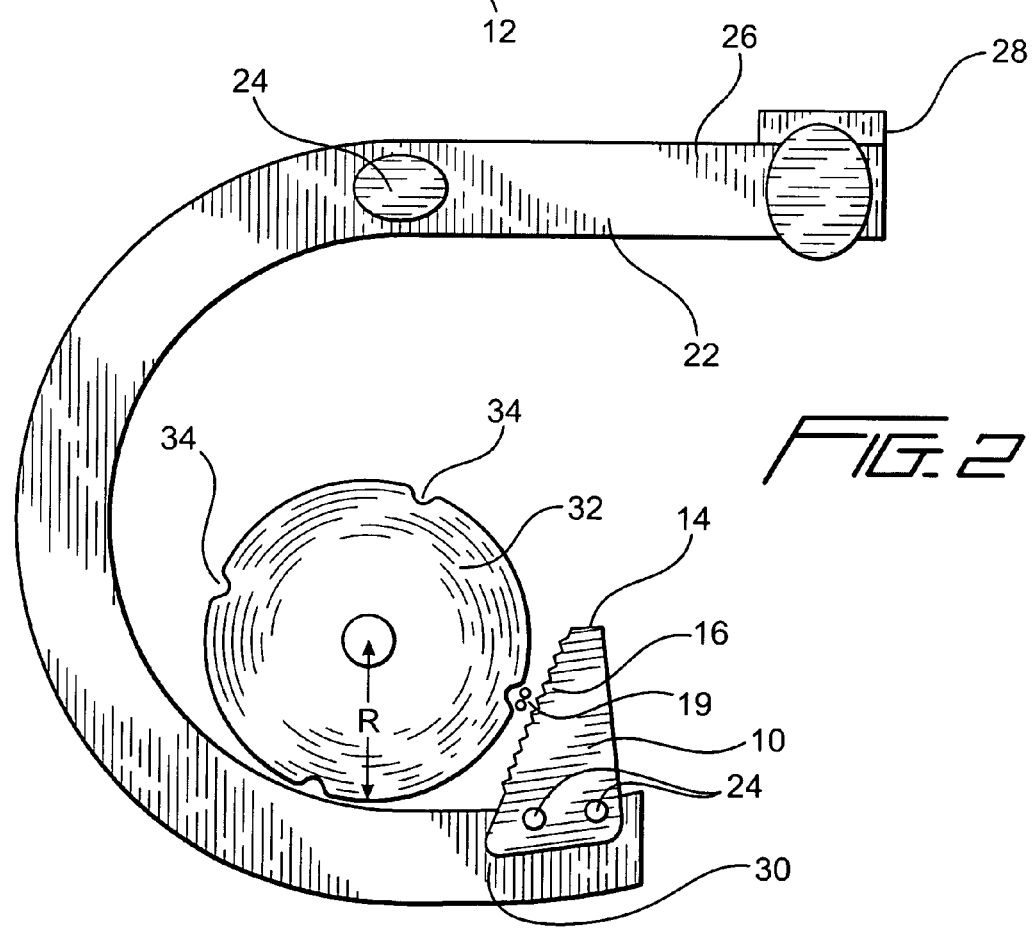
FIG. 2

TWINE CUTTING KNIFE FOR SQUARE BALER APPARATUS

BACKGROUND OF THE INVENTION

1. Field of the Invention

The invention relates to hay and grass balers and, in particular, to a twine cutting knife for cutting twine used to wrap bales formed with the balers.

2. Description of the Prior Art

Ranchers and farmers grow, cut and store grass and hay in rectangular bales to feed livestock during severe winter weather when grass is dormant and livestock cannot graze (round bales may also be gathered using different machinery). This process is performed with a piece of equipment called a square baler, such as, a John Deere 346 Series Baler. A square baler machine, attached to a tractor or similar farm vehicle, gathers and bales fresh cut grass for storage and later use. To keep the bales from falling apart during subsequent handling and storage, the bales are wrapped with twine as they are formed. The twine wrapping and baling operation are synchronized to the amount of grass constituting the size of a finished bale. The baler machine includes a twine spool or reel that feeds twine to and wraps it around the bales, and is then held for tying and cutting in a twine holding disk. After a pre-selected amount of grass or hay is bundled, a twine cutting knife severs the twine allowing the bale to be released from the baler before another bale is formed. Typically the twine knife is mounted on a pivot arm that rotates against the twine holding reel when the twine is cut.

Twine used in the baling process is now made with advanced polymer materials that provide great strength to ensure the integrity of the finished bale. However, this type of twine is more difficult to cut. The inability to cut the twine fully and cleanly after completion of a baling cycle creates a wide variety of problems. Usually the worker must get off the tractor and manually sever the twine. This results in wasted twine as well as wasted time. When the twine is not completely cut, the finished bale may not be properly released from the baler and the moving parts of the baler may be subjected to undue strain. This often results in damage to the baler itself, such as jamming the moving parts, causing mechanical breakdown of the baler.

Many twine cutters used on conventional square balers use knives not designed to cut the modern twine materials. The twine often merely slides across the edge of the knife and slips off the end without completely cutting the twine, resulting in problems discussed above. Even when the twine is properly cut, the knives wear out relatively quickly when used in conjunction with the advanced polymer twines currently being used within the industry, requiring frequent knife replacement.

Prior art blade structures are disclosed in the following patent art. U.S. Pat. No. 2,204,475 to Crandall discloses a knife blade for use with a winding machine. The knife may have either a solid or serrated cutting edge. U.S. Pat. No. 4,995,216 to Vansteelant discloses a bale wrapping control apparatus having a serrated knife. U.S. Pat. No. 5,349,806 to Swearingen et al discloses a wrapping machine for round balers. The twine knife includes a serrated blade that cleanly severs the free end from the twine supply. U.S. Pat. No. 5,709,143 to Bentley discloses a round bale, twine cutter having a steel knife. U.S. Pat. No. 5,878,498 to Mundt discloses a steel tool for cutting bale twine.

However, these blade structures are used in very different environments than the knives employed in the use of square balers, such as, the John Deere 346 Series Balers. As the problems encountered are very different, the disclosures are not believed to address the problems currently encountered in the use and operation of square balers. For example, square balers are from time to time, and under certain circumstances, confronted with sap build-up problems not commonly encountered in other types of balers. In addition, the orientation of the various components in square balers is different from other baler types, necessitating different considerations in component design.

As such, a need exists for an improved tissue cutting apparatus for a square baler apparatus. The present invention provides such an apparatus.

SUMMARY OF THE INVENTION

The present invention overcomes the difficulties of the prior art and provides a twine cutting knife for use with square baler machines. The twine cutting knife has a unique structural shape for cutting twine. The shape of the knife is an upright, tapering design having an angled cutting edge with a serrated blade. The serrated cutting edge of the knife provides a structure that creates a positive hold on the twine and improves the cutting action, eliminating any tendency for the twine to slip across the cutting edge surface. Preferably, the knife is made of forged steel for increased strength. The serration and forging virtually eliminates any need for sharpening and maintenance. It is, therefore, an object of the present invention to provide an improved, twine cutting knife for a grass and hay square baler apparatus that ensures twine is completely severed during the twine cutting operation.

Another object of the present invention is the provision of a baler twine cutting knife that eliminates baler malfunctions due to improper cutting of bale twine.

Still another object of the present invention is the provision of a baler twine cutting knife for use with polymer twines.

Yet another object is the provision of a baler twine cutting knife with a serrated cutting edge that eliminates slippage of the twine during a cutting operation.

Another object is the provision of a twine cutting knife requiring minimum maintenance and eliminating the need for sharpening.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a view of a twine cutting knife in accordance with the present invention.

FIG. 1a shows a detailed view of the cutting edge of FIG. 1.

FIG. 2 is a schematic view of the twine cutting knife in combination with a twine holding disc.

DESCRIPTION OF THE PREFERRED EMBODIMENT

Figure 3:
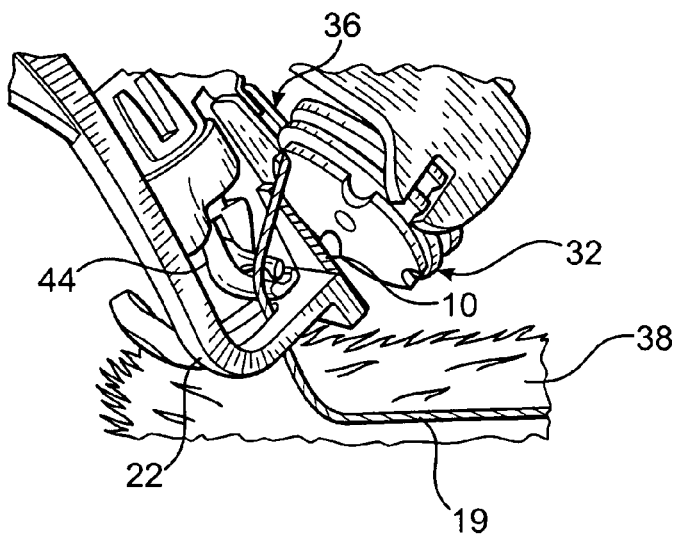
FIGS. 3 to 8 showing the steps associated with knot tying in accordance with use of the present twine cutting knife in a square baler.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as the basis for the claims and as a basis for teaching one skilled in the art how to make and/or use the invention.

The present invention is an improved structure for cutting baling twine associated with a conventional square baler apparatus. Typically, a square baler is attached to a tractor, or similar farm vehicle that drives the baler in a field of cut grass or hay to be baled. The baler gathers and automatically bales the cut grass or hay. As the bales are formed they are wrapped with baling twine to maintain the bale's integrity for subsequent handling and storage. The baling twine is stored on a supply reel and fed around the baled grass or hay as the baler moves across a field picking up grass or hay. When a preselected amount of grass or hay is baled, the twine is cut to complete a bale. The process continues until the baling operation is complete.

Such square balers are well known in the prior art and, as such, detailed operation thereof is not disclosed herein in detail. In particular, the present invention is specifically designed for use with square balers, such as, the well known John Deere 346 Series Balers. Other similar balers are disclosed with reference to U.S. Pat. No. 2,926,599, entitled "TYING MECHANISM FOR BALERS AND THE LIKE", issued Mar. 1, 1960, to McClellan, U.S. Pat. No. 3,101,963, entitled "KNOTTER HOOK FOR BALERS", issued Aug. 27, 1963, to Sullivan et al., U.S. Pat. No. 4,222,220, entitled "KNOTTER MECHANISM", issued Sep. 16, 1980, to Nolt et al., and U.S. Pat. No. 4,735,446, entitled "TWINE KNOTTER FOR BALING PRESSES", issued Apr. 5, 1988, to Homberg, all of which are incorporated herein by reference.

With reference to FIG. 1, and in accordance with a preferred embodiment of the present invention, the present invention relates to a square baler apparatus for cutting baling twine after a bale is wrapped. As such, the present invention is focused upon a twine cutting knife 10 having an elongated, angled cutting edge 16 with a plurality of serrations 18 on the cutting edge 16. The serrations 18 include a downwardly directed cutting edge 18a shaped and dimensioned for interacting with twine 19 in a manner which optimizes severing thereof, while also providing for an extended useful life when compared to prior art balers.

As will be discussed below in greater detail, the use of a serrated cutting edge 16 with downwardly directed cutting edges 18a allows the twine cutting knife 10 to grab the twine 19 while it is rotated by the twine holding disk 32. This provides for efficient cutting without concern that the twine 19 will slide up and over the twine cutting knife 10 during operation thereof. In addition, it has been found that the interaction of the twine 19 with the serrations 18 on the cutting edge 16 provides a continuous cleaning action, removing sap from cut hay that might otherwise hinder operation of the baler as it accumulates upon the twine cutting knife 10.

More particularly, the twine cutting knife 10 is made of forged steel for increased strength and rigidity to withstand the stresses of the cutting operation as the bales are formed. The twine cutting knife 10 is trapezoidal in shape having a lower mounting, or fixed, end 12 and an upper edge or free end 14. The twine cutting knife 10 includes an elongated, angled cutting edge 16 having a plurality of serrations 18 along its length. Referring to FIG. 1a, the serrations 18 include downwardly located cutting edges 18a that are generally perpendicular to the longitudinal axis 17 of the twine cutting knife 10 and second cutting edges 18b at an oblique angle to the longitudinal axis 17. The downwardly located cutting edge 18a serves to grab and hold the baling twine 19 as it is being cut to ensure the twine 19 does not slip from the twine cutting knife 10 before it is fully cut. The lower end 12 of the twine cutting knife 10 includes mounting holes 20 to facilitate mounting to the knife arm 22.

As briefly mentioned above, the twine cutting knife 10 is designed for use in conjunction with square balers. More particular, and with reference to FIG. 2, a baling twine cutting apparatus (for which the present twine cutting knife 10 is constructed) associated with a conventional baler (not shown) includes a C-shaped, knife arm 22 that pivots relative to the baler frame around a central pivot pin 24. A first end 26 of the knife arm 22 cooperates with a cam arrangement 28 to pivot the knife arm 22 to a twine cutting position. The second end 30 of the knife arm 22 mounts the forged steel twine cutting knife 10 with rivets 24 or other suitable fasteners using the mounting holes 20. The twine cutting knife 10 is mounted in close proximity to a twine holding disc 32 having a plurality of notches 34 that gather the twine during the wrapping, knotting and cutting operation. The cutting edge 16 of the twine cutting knife 10 extends a distance greater than the radius of the twine holding disc 32 when the twine cutting knife 10 is in a cutting position thereby ensuring the angled cutting edge 16 contacts the twine 19 during the cutting step.

When a sufficient amount of grass or hay is gathered and shaped into a bale, the knife arm 22 is rotated, placing the twine cutting knife 10 in contact with the twine 19 as it is grasped by the twine holding disc 32. The elongated shape of the twine cutting knife 10 and the serrated cutting edge 16 creates a positive hold of the twine 19 and pulls the twine 19 down into a notch 34 on the twine holding disc 32 and cleanly cuts the twine. There is no slippage of the twine 19 during the cutting process, eliminating malfunction of the baler during the cutting process.

Figure 4:
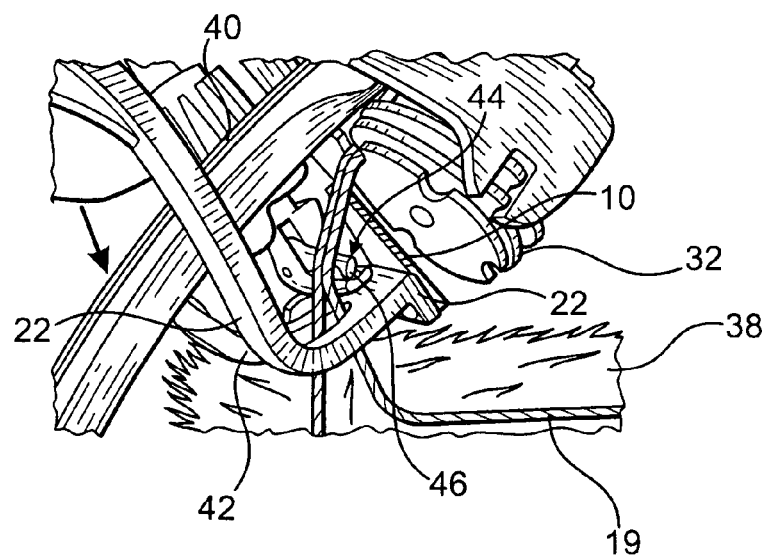
Figure 5:
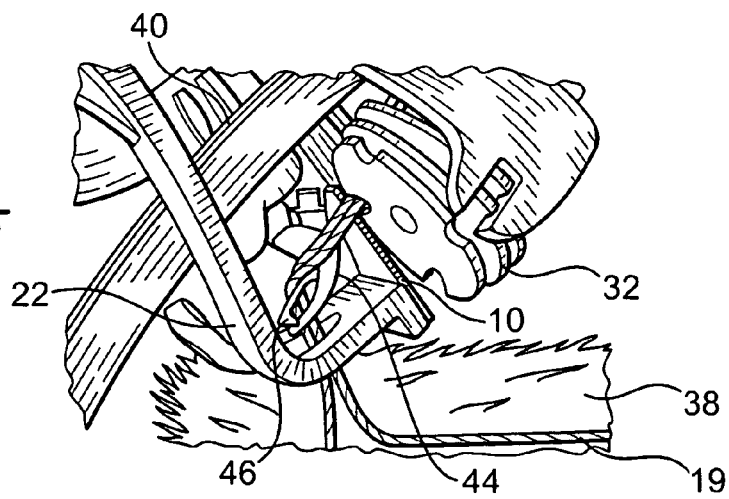

The effectiveness of the present twine cutting knife 10 will be further appreciated when one considers the tying cycle of a square baler as shown in FIGS. 3 to 8. In particular, and with reference to FIG. 3, after the needle 40 has been threaded with the twine 19, the twine 19 is held in the twine holding disk 32 by the twine holder 36. As the bale 38 is formed within the remainder of the baling apparatus, the twine 19 is pulled from the twine reservoir (not shown). Referring to FIG. 4, when the bale 38 reaches its proper length, the measuring wheel (not shown) trips the tying mechanism and the needle 40 brings the second strand of the twine 19 through the guide 42 on the knife arm 22, across the billhook 44 and into the twine holding disk 32. Moving now to FIG. 5, the billhook 44 starts its revolution when the gear teeth on the intermittent knotter gear have operated the disk driving pinion and turned the twine holding disk 32 sufficiently to permit the twine holder 36 to secure both strands of twine 19 in the twine holding disk 32.

Figure 6:
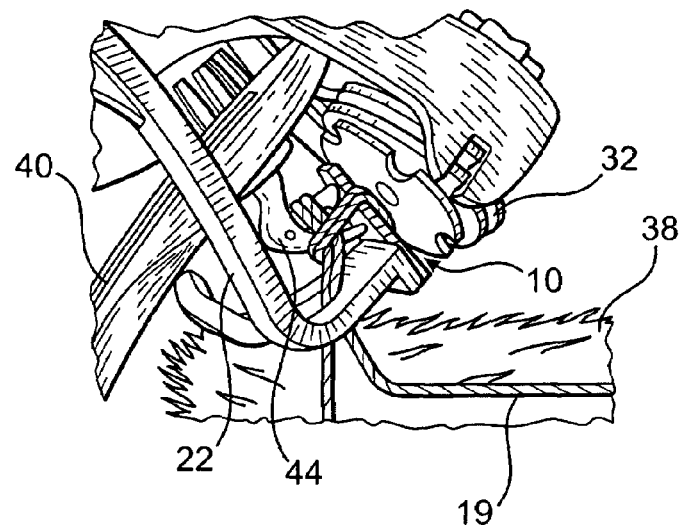

Looking at FIG. 6, as the billhook 44 turns clockwise, a loop of twine 19 is formed around the billhook 44 and the jaw 46 opens to receive the twine 19. The twine cutting knife 10 then advances, ready to cut the twine 19 between the billhook 44 and the twine holding disk 32. As the twine holding disk 32 continues to rotate in a counterclockwise direction, the twine 19 is brought into contact with the cutting edge 16 of the twine cutting knife 10. The serrations 18, in particular, the downwardly located cutting edges 18a hooks into the twine 19 forcing the fibers of the twine 19 down and back into the sharp V-shaped edges defined by the downwardly located cutting edge 18a and the second cutting edge 18b. This causes the severing of the twine 19, ensuring a clean cut each time.

It is this action that represents the present twine cutting knife's advancement over the prior art. By hooking and cutting the twine 19 in this manner, the present twine cutting knife 10 obviates any worries that the twine 19 will slide up and over the twine cutting knife 10 as the twine holding disk 32 rotates in a counterclockwise direction. With this in mind, and considering the fact a preferred embodiment employs a downwardly located cutting edge 18a which is generally perpendicular to the longitudinal axis 17 of the twine cutting knife 10, those skilled in the art will appreciate the downwardly located cutting edge 18a may be oriented from approximately perpendicular to the longitudinal axis 17 to a slight downward taper (for example, 5 to 10 degrees downward from perpendicular) while remaining within the spirit of the present invention.

Because the twine cutting knife 10 hooks the twine in this manner, prevent sliding toward the upper edge 14 thereof, the length of the cutting edge 16 is not critical to proper functioning of the present twine cutting knife 10. However, and in accordance with a preferred embodiment, the cutting edge 16 of the twine cutting knife 10 is at least as long as the radius of the twine holding disk 32. This ensures a sufficient surface for contact between the twine 19 and the twine cutting knife 10. In addition, the ability of the twine cutting knife 10 to hook the twine enhances the twine cutting knife's ability to sever the twine 19 and complete calibration of the twine holding disk 32 is, therefore, not critical.

Figure 7:
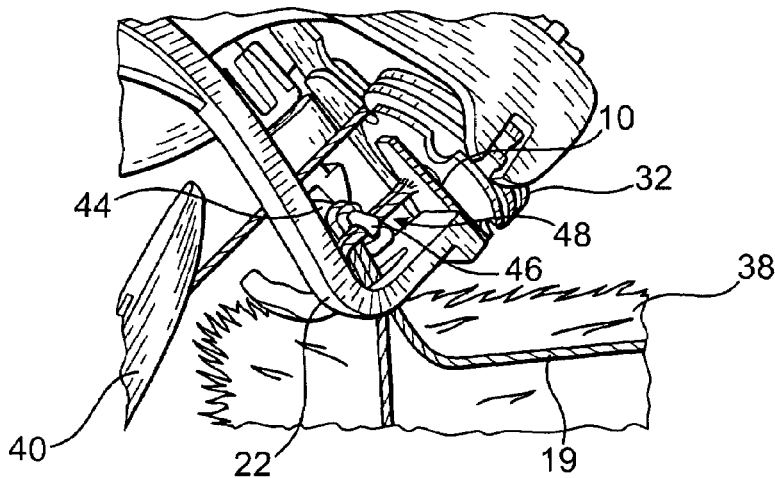
Figure 8:
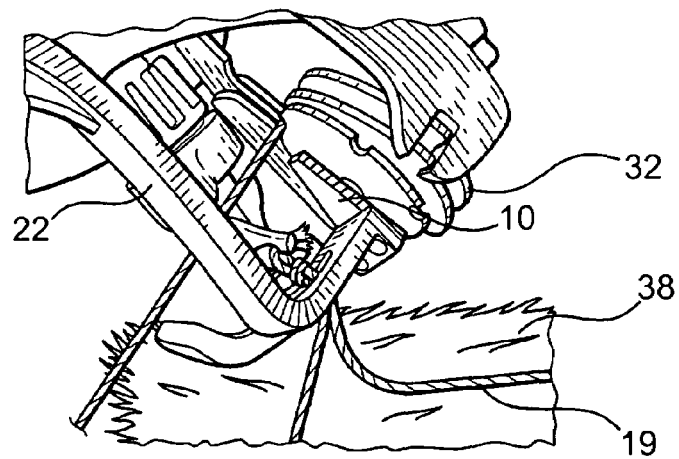

At this stage, the needle 40 begins to recede, leaving twine 19 in the twine holding disk 32 which will be held there for the next knot. Referring to FIG. 7, the billhook jaw 46 has closed and now holds the ends of the twine 19 tightly. The twine 19 has been cut and the wiper 48 on the knife arm 22 advances to wipe the looped twine 19 from the outside of the billhook 44, as the jaws 46 hold the two cut ends of twine 19 preparatory to completing the knot. Finally, and as shown in FIG. 8, the knot is tied and drops from the billhook 44, which completes the tie around the bale 38.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. In a square baler apparatus for cutting baling twine after a bale is wrapped, wherein the improvement comprises: a twine cutting knife having a fixed end and a free end, an elongated, angled cutting edge extending between said fixed end and said free end, and, a plurality of serrations on said cutting edge, said serrations including downwardly located cutting edges approximately perpendicular to a longitudinal axis of the twine cutting knife and second cutting edges at an oblique angle to said longitudinal axis; said square baler apparatus further including a twine holding disc mounted in proximity to said twine cutting knife such that said downwardly located cutting edge grabs twine as it is rotated by the twine holding disc, wherein said elongated, angled cutting edge extends a distance greater than a radius of said twine holding disc when said twine cutting knife is in a cutting position, and wherein each of the downwardly located cutting edges is positioned opposite to each of the second cutting edges.

2. The apparatus of claim 1 wherein said twine cutting knife is formed of forged steel.

3. A twine cutting apparatus in combination with an automated square baler wherein the improvement comprises: a twine holding disc for holding twine after a needle places it within the twine holding disc; a knife arm including a twine cutting knife fixed thereon; said knife arm having a central pivot pin, a first end of said knife arm structured to cooperate with a cam surface to pivotably rotate said knife arm into a twine cutting position; said knife arm including a second end; said twine cutting knife mounted on said second end of said knife arm; said twine cutting knife having an elongated, angled cutting edge including a plurality of serrations on said cutting edge, said serrations including downwardly located cutting edges approximately perpendicular to a longitudinal axis of the twine cutting knife and second cutting edges at an oblique angle to said longitudinal axis; said elongated, angled cutting edge extending a distance greater than the radius of said twine holding disc when said twine cutting knife is in a cutting position to present an elongated cutting surface to cut said twine, wherein each of the downwardly located cutting edges is positioned opposite to each of the second cutting edges.

4. The twine cutting apparatus of claim 3 wherein said twine cutting knife is further defined by a fixed end and a free end, the elongated, angled cutting edge extending between said fixed end and said free end.

5. The twine cutting apparatus of claim 3 wherein said twine cutting knife is forged steel.

* * * * *